United States Patent [19]

Nomura et al.

[11] 4,196,592
[45] Apr. 8, 1980

[54] HYDRAULIC BRAKE BOOSTER

[75] Inventors: Yoshihisa Nomura, Toyota; Takaaki Ohta, Okazaki, both of Japan

[73] Assignee: Toyota Jidosha Kogyo Kabushiki Kaisha, Toyota, Japan

[21] Appl. No.: 857,937

[22] Filed: Dec. 6, 1977

[30] Foreign Application Priority Data

May 31, 1977 [JP] Japan .................................. 52-64490

[51] Int. Cl.² ............................................ B60T 13/00
[52] U.S. Cl. .................................. 60/547 R; 60/547 A; 91/31
[58] Field of Search ................... 60/547, 547 A, 547 B, 60/548, 593, 552, 553, 554; 91/391 R, 370, 6, 31

[56] References Cited

U.S. PATENT DOCUMENTS

| 3,782,781 | 1/1974 | Lewis | 60/547 |
|---|---|---|---|
| 3,898,809 | 8/1975 | Baker | |
| 3,998,128 | 12/1976 | Adachi | 91/391 R |
| 4,014,171 | 3/1977 | Kobashi | 60/547 |
| 4,023,466 | 5/1977 | Strassheimer | 91/6 |
| 4,075,848 | 2/1978 | Ueda | 60/548 |

Primary Examiner—Abraham Hershkovitz
Attorney, Agent, or Firm—Oblon, Fisher, Spivak, McClelland & Maier

[57] ABSTRACT

A hydraulic brake booster of the type utilizing pressurized fluid supplied to a hydraulically operated device comprises a flow regulating valve adapted to rapidly increase the pressure in a power chamber of the booster in response to actuation of a control piston and another flow regulating valve adapted to ensure supply of the pressurized fluid to the hydraulically operated device. In the brake booster, the first-named valve includes an annular recess formed on the control piston for permitting the flow of fluid supplied to the power chamber when the control piston is in an original position and blocking the flow of fluid to the power chamber when the control piston is moved, and an orifice for throttling the flow of fluid supplied to the power chamber in response to movement of the control piston.

3 Claims, 8 Drawing Figures

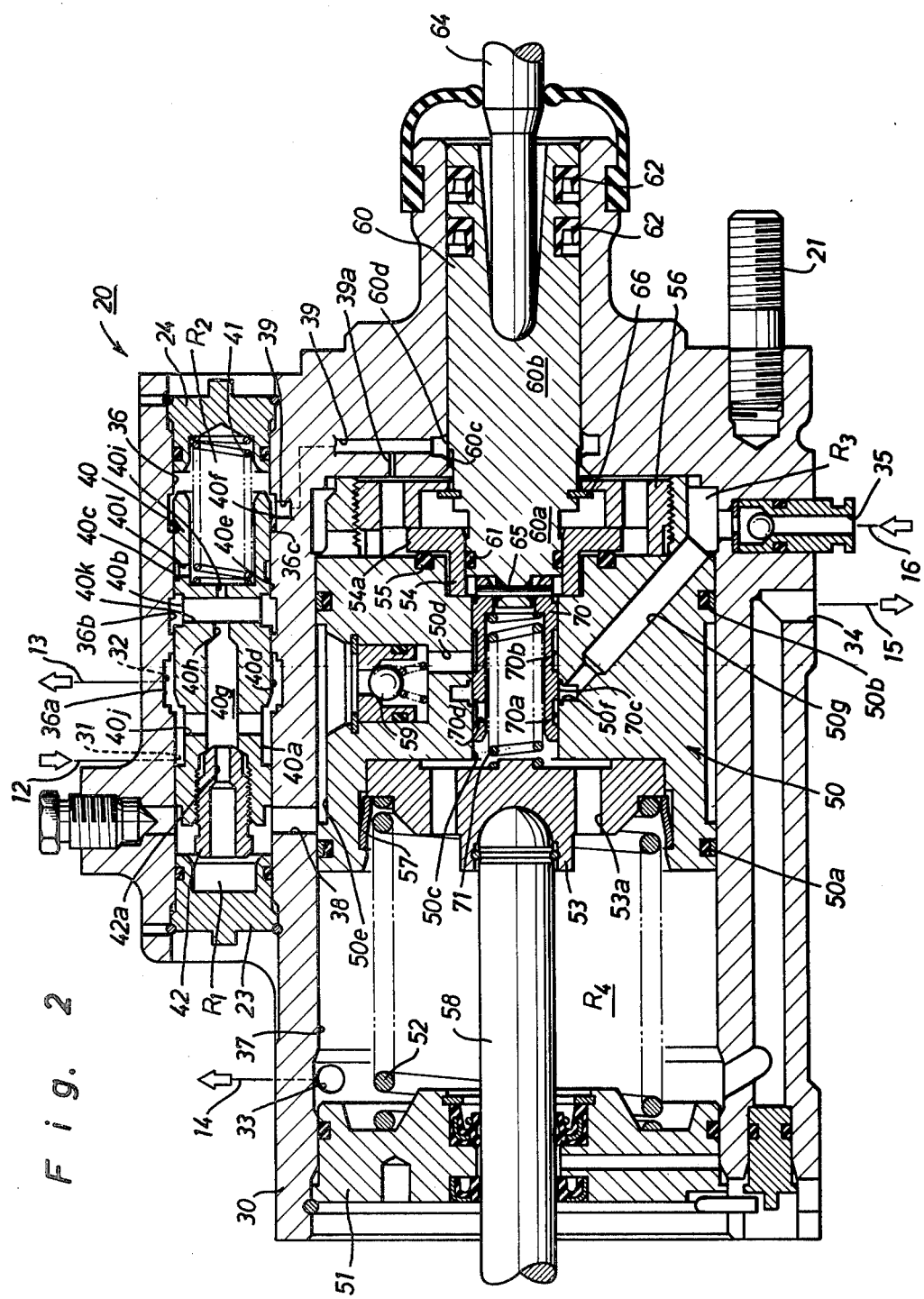

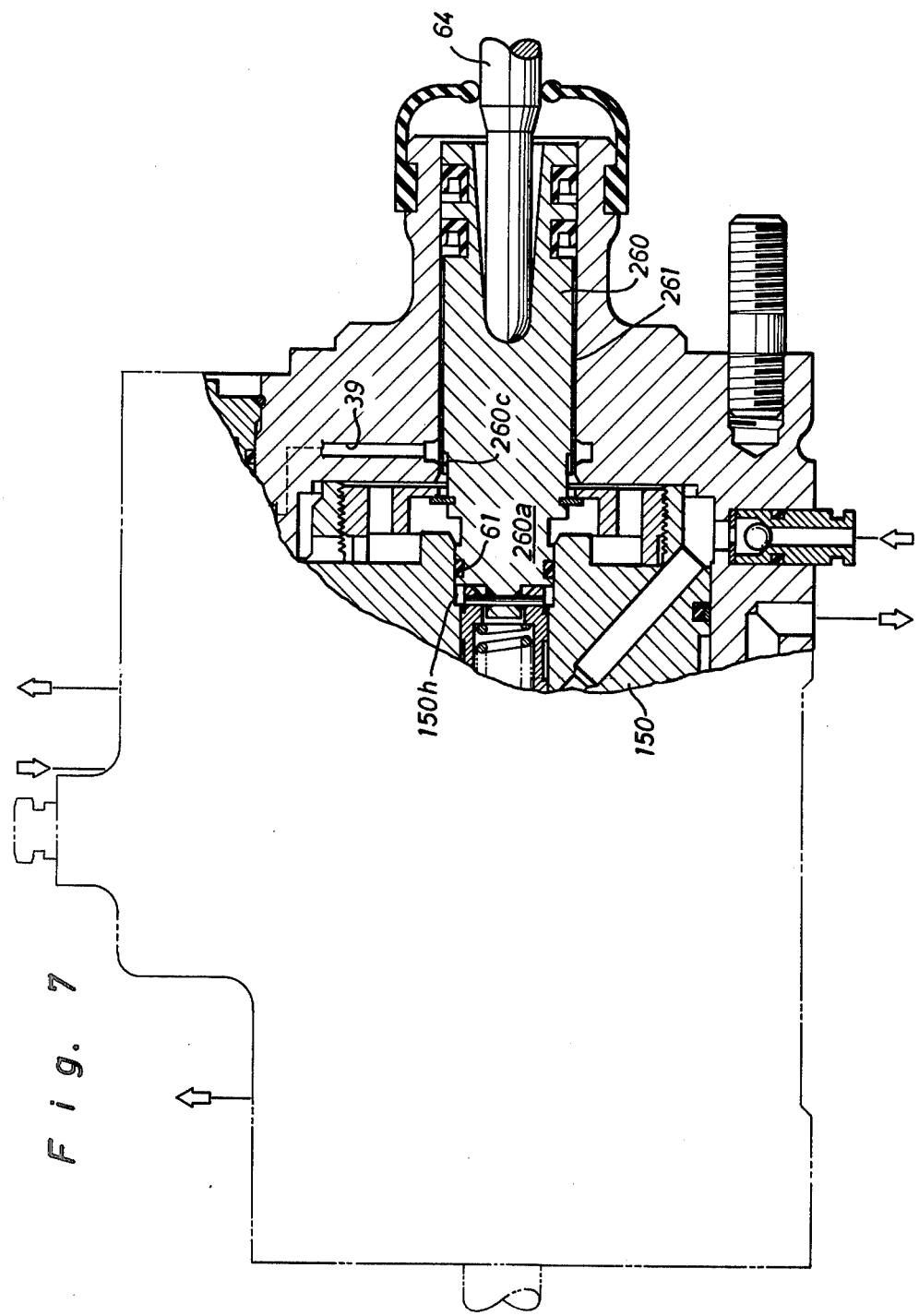

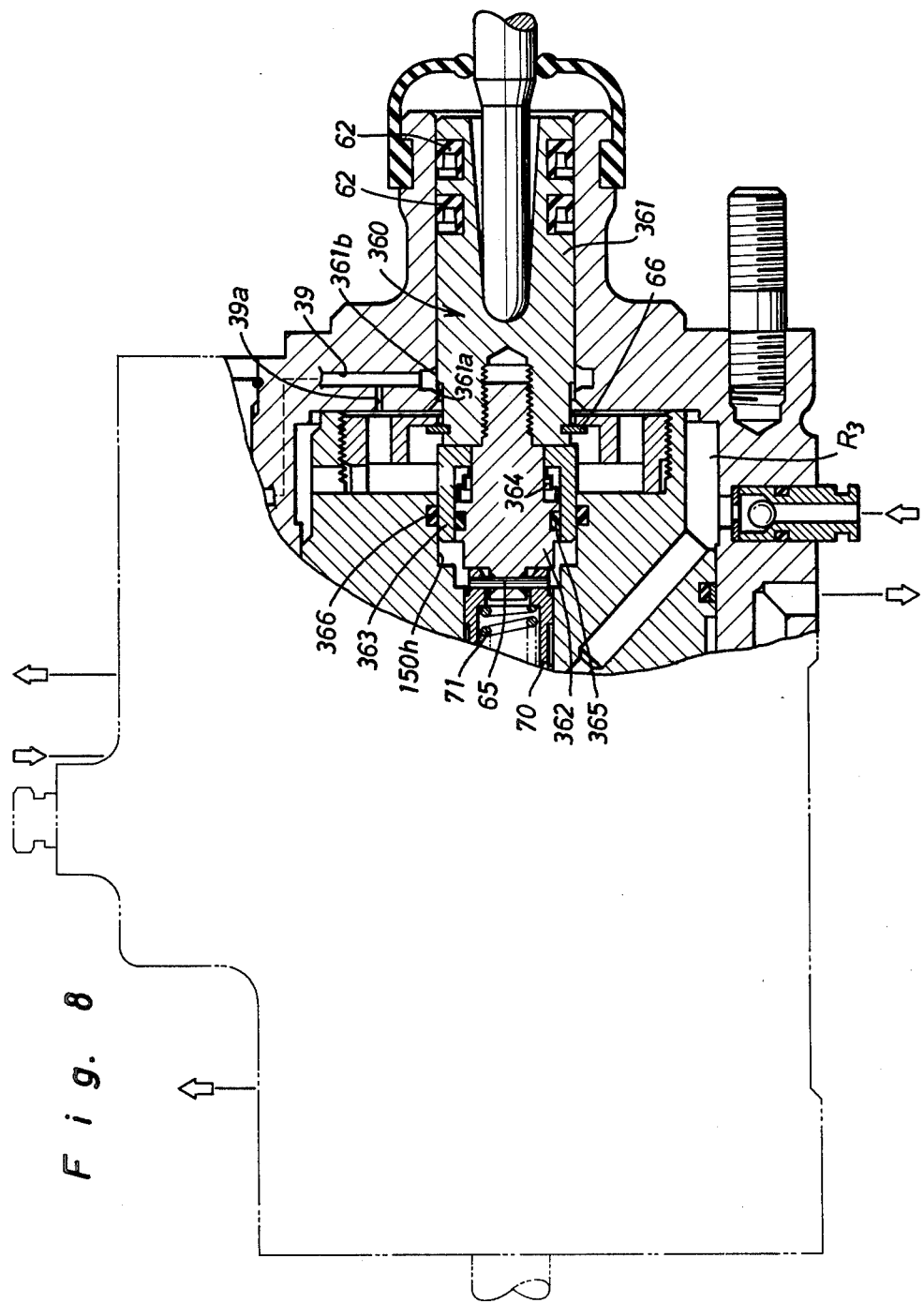

HYDRAULIC BRAKE BOOSTER

BACKGROUND OF THE INVENTION

1. Field of the Invention

The present invention relates to a hydraulic power brake device for wheeled vehicles, and more particularly to a hydraulic brake booster of the type utilizing pressurized fluid supplied to a hydraulically operated device such as a power steering device and the like.

2. Description of the Prior Art

As a conventional brake booster of this type, there has been introduced a hydraulic brake booster in which a first flow regulating valve is adapted to rapidly increase the pressure in a power chamber in response to the braking operation and a second flow regulating valve is adapted to ensure supply of the pressurized fluid to the hydraulically operated device. In the above-noted brake booster, the first flow regulating valve includes a spring loaded valve member which is operated by a control piston or a power piston to block the flow of fluid supplied into the power chamber in response to the braking operation. The valve member is also provided thereon with an orifice to throttle the flow of fluid supplied into the power chamber so as to increase the pressure in the power chamber. This means that the assembly of the valve member is complicated and the control piston or the power piston remains in a position with a large reaction force against loading of the valve member. It is, therefore, observed that production cost of the booster becomes high and smooth operation of the booster may not be assured.

SUMMARY OF THE INVENTION

Accordingly, a primary object of the present invention is to provide a hydraulic brake booster suitable for mass production wherein the above-noted first flow regulating valve is simply constructed to ensure smooth operation of the booster.

In a preferred embodiment of the present invention, there is provided a hydraulic brake booster for a vehicle having a brake activating means, a master cylinder for supplying pressure to the wheel cylinders of the vehicle, a hydraulic circuit for circulating pressurized fluid from a fluid pressure source to a reservoir by way of a hydraulic power control device, the brake booster comprising:

a housing for interposition within the hydraulic circuit between the pressure source and the power control device, the housing being provided therein with a stepped cylindrical bore and thereon with an inlet port, an outlet port and a drain port respectively in communication with the pressure source, the power control device and the reservoir;

a power piston reciprocable within a large diameter portion of the stepped cylindrical bore for forming at one side thereof a power chamber and at the other side thereof a drain chamber in communication with the drain port, the power piston being operatively connectable at one end thereof with the master cylinder and being provided therein with an axial bore opening toward the power chamber and the drain chamber;

a control piston reciprocable within a small diameter portion of the stepped cylindrical bore and the axial bore of the power piston to control interconnection between the power chamber and the drain chamber, the control piston being operatively connectable to the brake activating means;

a first passage means for connecting the inlet port to the power chamber through the axial bore of the power piston;

a control means disposed within the axial bore of the power piston for selectively closing and opening the interconnection between the power chamber and the drain chamber in response to movement of the control piston;

a second passage means for connecting the inlet port with the power chamber independently of the first passage means;

a first flow regulating means disposed within the second passage means for controlling the flow of fluid supplied from the inlet port to the chamber in response to movement of the control piston; and a second flow regulating means disposed within the second passage means between the inlet port and the first flow regulating means for controlling the flow of fluid from the inlet port to the outlet port and the flow of fluid from the inlet port to the power chamber through the first flow regulating means.

In the brake booster, the first flow regulating means comprises an annular recess provided on the outer periphery of the control piston located within the small diameter portion of the stepped cylindrical bore for permitting the flow of fluid supplied from the inlet port to the power chamber through the second flow regulating means when the control piston is in an original position and blocking the flow of fluid supplied from the inlet port to the power chamber through the second flow regulating means when the control piston is moved toward the drain chamber from the original position and an orifice disposed within the second passage means for throttling the flow of fluid supplied from the inlet port to the power chamber through the second flow regulating means in response to movement of the control piston toward the drain chamber.

In another preferred embodiment of the present invention, the orifice of the first regulating means is replaced with an annular passage around the control piston within the small diameter portion of the stepped cylindrical bore for throttling the flow of fluid supplied from the inlet port to the power chamber through the second flow regulating means in response to movement of the control piston toward the drain chamber.

BRIEF DESCRIPTION OF THE DRAWINGS

Additional objects and advantages of the present invention will be more readily apparent from the following detailed description of preferred embodiments thereof when taken together with the accompanying drawings in which:

FIG. 2 is an elevational sectional view illustrating a preferred embodiment of the brake booster in accordance with the present invention;

FIG. 7 is a partially broken view showing another modification of the brake booster; and FIG. 8 is a partially broken view showing a still further modification of the brake booster.

DESCRIPTION OF THE PREFERRED EMBODIMENTS

Figure 1:
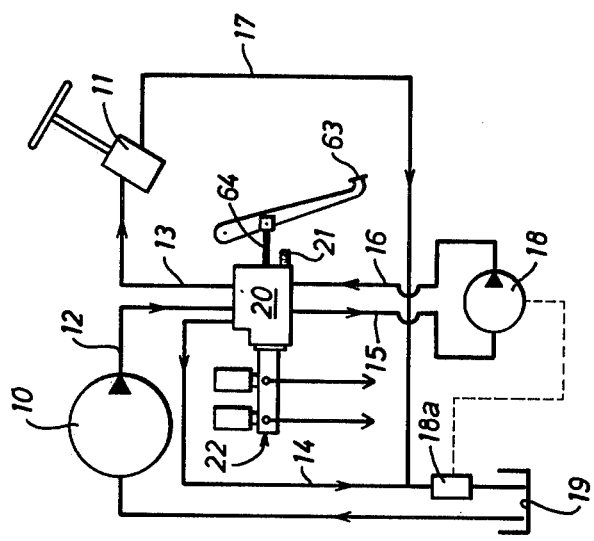
FIG. 1 is a diagrammatic view of a hydraulic power brake system for a vehicle including a hydraulic brake booster in accordance with the present invention.

Referring now to the drawings, particularly to FIG. 1, a hydraulic brake booster 20 according to the present invention is disposed in a hydraulic circuit connecting a hydraulic power steering device 11 to a fluid pump 10 driven by the prime engine of a vehicle. As clearly shown in FIG. 2, the brake booster 20 has a cylinder housing 30 fixedly mounted by stud bolts 21 in a conventional manner within the engine compartment of the vehicle. The housing 30 is provided therein with a control spool 40 reciprocable within a cylindrical bore 36, a power piston 50 reciprocable within a stepped bore 37, and a control piston 60 reciprocable within a small diameter portion of the stepped bore 37. At the left end of the housing 30 is attached a conventional tandem master cylinder to effect the braking operation of the vehicle, as shown in FIG. 1. The housing 30 is further provided thereon with an inlet port 31 connected to the fluid pump 10 by a conduit 12, an outlet port 32 connected to the power steering device 11 by a conduit 13, a drain port 33 connected to a fluid reservoir 19 by a conduit 14, and sub-ports 34 and 35 respectively connected by conduits 15 and 16 to an electrically operated fluid pump 18 for an emergency use. Within the housing 30, the inlet and outlet ports 31 and 32 are in open communication with the cylindrical bore 36, and the drain port 33 and the sub-port 34 are in open communication with the stepped bore 37, the sub-port 35 being communicated with the stepped bore 37 through a check valve 35a. The cylindrical bore 36 is arranged in parallel with the stepped bore 37 and communicated with the stepped bore 37 by way of a radial passage 38 and a passage 39 with an orifice 39a respectively. The cylindrical bore 36 is closed at opposite ends thereof with plugs 23 and 24 and is provided on the inner wall thereof with a first annular groove 36a opening to the outlet port 32, a second annular groove 36b, and a third annular groove 36c opening to the passage 39.

The control spool 40 is slidably disposed within the cylindrical bore 36 to form first and second chambers $R_1$ and $R_2$ and is biased leftwardly by a compression coil spring 41, the chambers $R_1$ and $R_2$ being in open communication with the passages 38 and 39 respectively. A plug 42 is secured to the left end of the spool 40 and includes an orifice 42a therein. The spool 40 is provided thereon with three annular grooves 40a, 40b and 40c forming three lands 40d, 40e and 40f, and is also provided with an axial passage 40g which includes two orifices 40h and 40i. The axial passage 40g is communicated with the grooves 40a and 40b through radial holes 40j and 40k, and the groove 40c is communicated with the second chamber $R_2$ through a radial hole 40l. Thus, while the brake booster 20 is inoperative, the spool 40 is located in a position due to difference in pressure between the chambers $R_1$ and $R_2$ such that the hydraulic fluid supplied to the first chamber $R_1$ from the fluid pump 10 flows into the steering device 11 by way of the annular groove 36a and the output port 32 and, simultaneously, a certain amount of the fluid flows into the second chamber $R_2$ through the axial passage 40g and the orifices 40h and 40i. The fluid supplied into the second chamber $R_2$ is further supplied through the annular groove 36c and the passage 39 into a power chamber $R_3$ described hereinafter.

The power piston 50 is slidably disposed through annular seal members 50a and 50b within a large diameter portion of the stepped bore 37 to form the power chamber $R_3$ and a drain chamber $R_4$. The power chamber $R_3$ is in open communication with the passage 39 through the orifice 39a and with the sub-port 35 through the check valve 35a, while the drain chamber $R_4$ is in open communication with the drain port 33 and the sub-port 34. The power piston 50 is provided therein with an axial bore 50c receiving a small diameter portion of the control piston 60 and is biased rightwardly by a compression coil spring 52 which is interposed between a plug 51 and a holder 53. The plug 51 is secured to the left end of the housing 30 to close the stepped bore 37 while the holder 53 is secured to the left end of the power piston 50 by a ring fastener 57 and receives an actuating rod 58 operatively connected to the tandem master cylinder. A sleeve member 54 is coupled with the right end of the power piston 50 through an annular seal member 55 and fixed in a position by a lock nut 56 threaded into the power piston 50. The axial bore 50c of the power piston 50 is communicated with the first chamber $R_1$ in the bore 36 by way of a radial hole 50d, a check valve 59, an annular groove 50e and the radial passage 38. The axial bore 50c is also communicated with the drain chamber $R_4$ through axial holes 53a of the holder 53 and is communicated with the power chamber $R_3$ through an annular groove 50f and a passage 50g.

The control piston 60 has a small diameter portion 60a slidable within the sleeve member 54 through an annular seal member 61 and a large diameter portion 60b slidable within the small diameter portion of the stepped bore 37 through annular seal cups 62. The control piston 60 is engaged at the right end thereof with a push rod 64 operatively connected with a brake pedal (not shown) and is connected at the left end thereof with a tubular spool 70 by a pin 65. The control piston 60 is provided thereon with an annular stopper 66 engageable with an inner shoulder of the lock nut 56 and provided with an annular recess 60c which permits the flow of fluid from the passage 39 to the power chamber $R_3$. Thus, a land 60d of the piston 60 cooperates with the inner wall of the small diameter portion of the stepped bore 37 to provide a cut-off valve for opening and closing the fluid communication between the passage 39 and the power chamber $R_3$.

The tubular spool 70 is slidable within the axial bore 50c of the power piston 50 and is biased rightwardly by a compression coil spring 71 engaged at its left end with the holder 53. The spool 70 is provided thereon with a pair of annular groove 70a and 70b co-operating with the groove 50f and the radial hole 50d of the power piston 50. The groove 70a is in open communication with the drain chamber $R_3$ through a radial hole 70d, the axial bore 50c and the holes 53a of the holder 53.

Furthermore, in FIG. 1 there are illustrated a pipe 17 connecting the steering device 11 to the pipe 14 and a flow detecting switch 18a disposed within the pipe 14 at the downstream of the pipe 17 to detect the flow of fluid in the pipe 14. When the flow of fluid is not detected in the pipe 14, the switch 18a is closed to operate the fluid pump 18.

OPERATION OF THE BRAKE BOOSTER

While the brake booster 20 and the power steering device 11 are inoperative, hydraulic fluid from the fluid pump 10 flows through the pipe 12 into the inlet port 31 and subsequently flows by way of the outlet port 32 and the pipe 13 into the steering device 11. At the same time, a certain amount of the hydraulic fluid flows into the second chamber $R_2$ through the radial hole 40j, the passage 40g, the orifices 40h and 40i of the spool 40. The supplied fluid in the second chamber $R_2$ flows into the power chamber $R_3$ through the passage 39 and the orifice 39a and through the annular recess 60c of the control piston 60, subsequently flows into the drain chamber $R_4$ through the passage 50g, the groove 50f, 70a, the radial hole 70d, the axial bore 50c and the holes 53a, and finally is returned into the reservoir 19 through the drain port 33 and the pipe 14. Under this condition, the radial hole 50d of the power piston 50 is closed by the land 70c of the tubular spool 70 to interrupt the flow of fluid from the first chamber $R_1$ to the groove 50f.

Figures 3, 4:
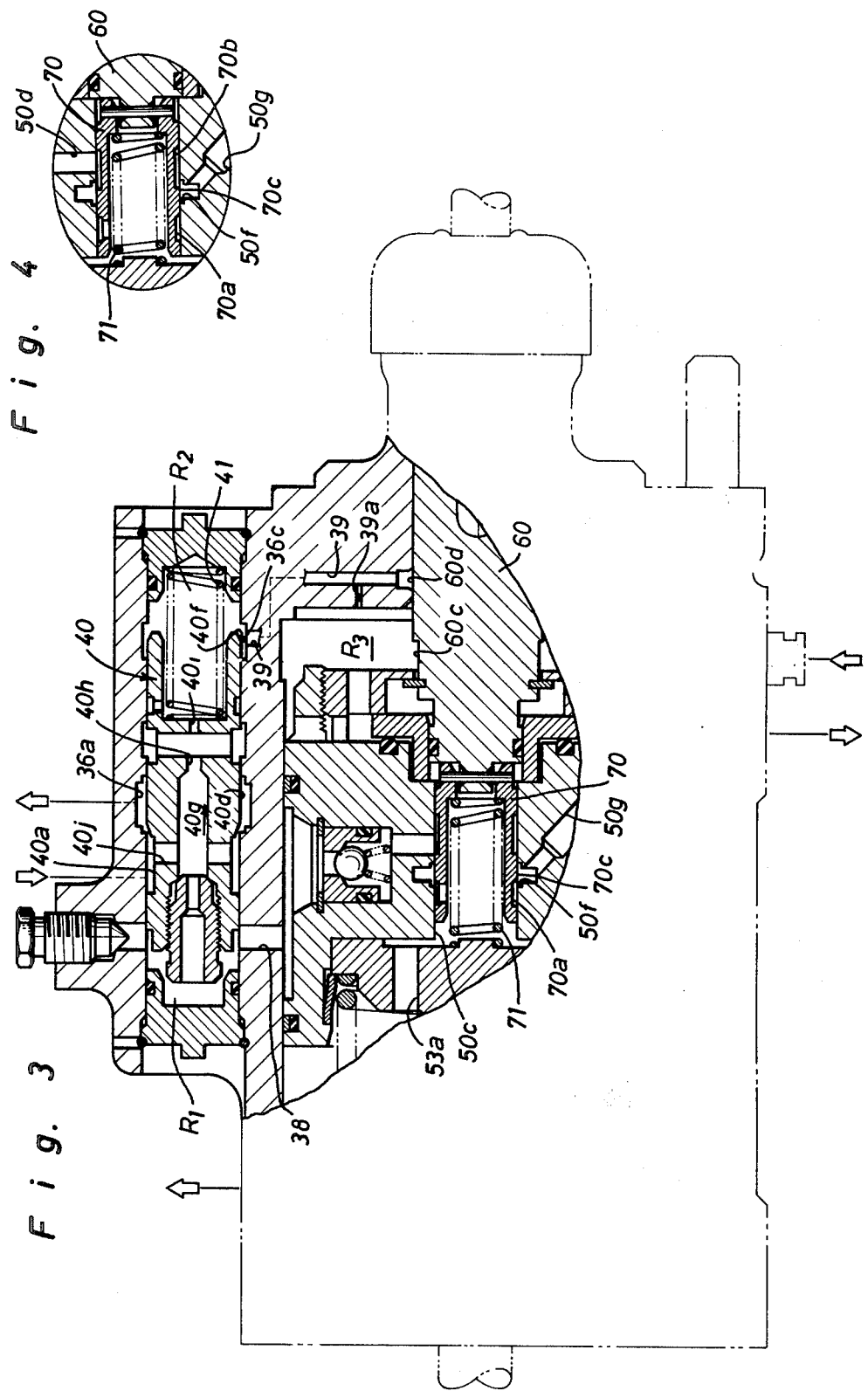
FIGS. 3 to 5 respectively illustrate operation modes of the brake booster of FIG. 2.

When a brake application is made under a condition where no steering correction is being made, depression of the brake pedal 63 causes leftward movement of the control piston 60 and the tubular spool 70 by way of the push rod 64. As a result of leftward movement of the control piston 60, as shown in FIG. 3, the land 60d of the piston 60 blocks the flow of fluid passing through the annular recess 60c of the piston 60, and the land 70c of the spool 70 restricts the fluid communication between the grooves 50f and 70a. After closure of the annular recess 60c of the control piston 60, the flow quantity of fluid from the second chamber $R_2$ to the power chamber $R_3$ is throttled by the orifice 39a to increase the pressure in the second chamber $R_2$. The increased pressure in the second chamber $R_2$ will cause leftward movement of the spool 40 to throttle the fluid communication between the grooves 40a and 36a, which rapidly increases the pressure in the first chamber $R_1$. Thus, the increased pressure in the first chamber $R_1$ is applied to the power chamber $R_3$ across the spool 40 and the second chamber $R_2$ so that the power piston 50 is moved leftwardly against biasing force of the coil spring 52 to actuate the master cylinder by way of the actuating rod 58.

During the braking operation, there is produced little pressure changes in the power chamber $R_3$ by pulsing operation of the pump P, because the power chamber $R_3$ is supplied with pressure only through the orifice 39a. Further, pressure control in the power chamber $R_3$ is conducted by the tubular spool 70 of the control piston 60 adjusting the fluid communication between the grooves 70a and 50f.

In case the brake pedal 63 is rapidly depressed, as clearly shown in FIG. 4, the fluid communication between the grooves 50f and 70a is blocked by the land 70c of the tubular spool 70 under leftward movement of the control piston 60, whereas the groove 50f is communicated with the groove 70b to permit the flow of fluid passing across the radial passage 50d and passage 50g. Thus, the pressure developed in the first chamber $R_1$ is applied to the power chamber $R_3$ by way of the radial passage 38, the groove 50e, the check valve 59, the passage 50d, the grooves 70b, 50f, and the passage 50g, and simultaneously, the pressure developed in the second chamber $R_2$ is also applied to the power chamber $R_3$. This causes quick leftward movement of the power piston 50 to produce greater braking force. Immediately after the leftward movement of the power piston 50, the fluid communication between the grooves 70b and 50f is blocked by the land 70c of the tubular spool 70, whereas the groove 50f is communicated with the groove 70a of the spool 70, as shown in FIG. 3.

Figure 5:
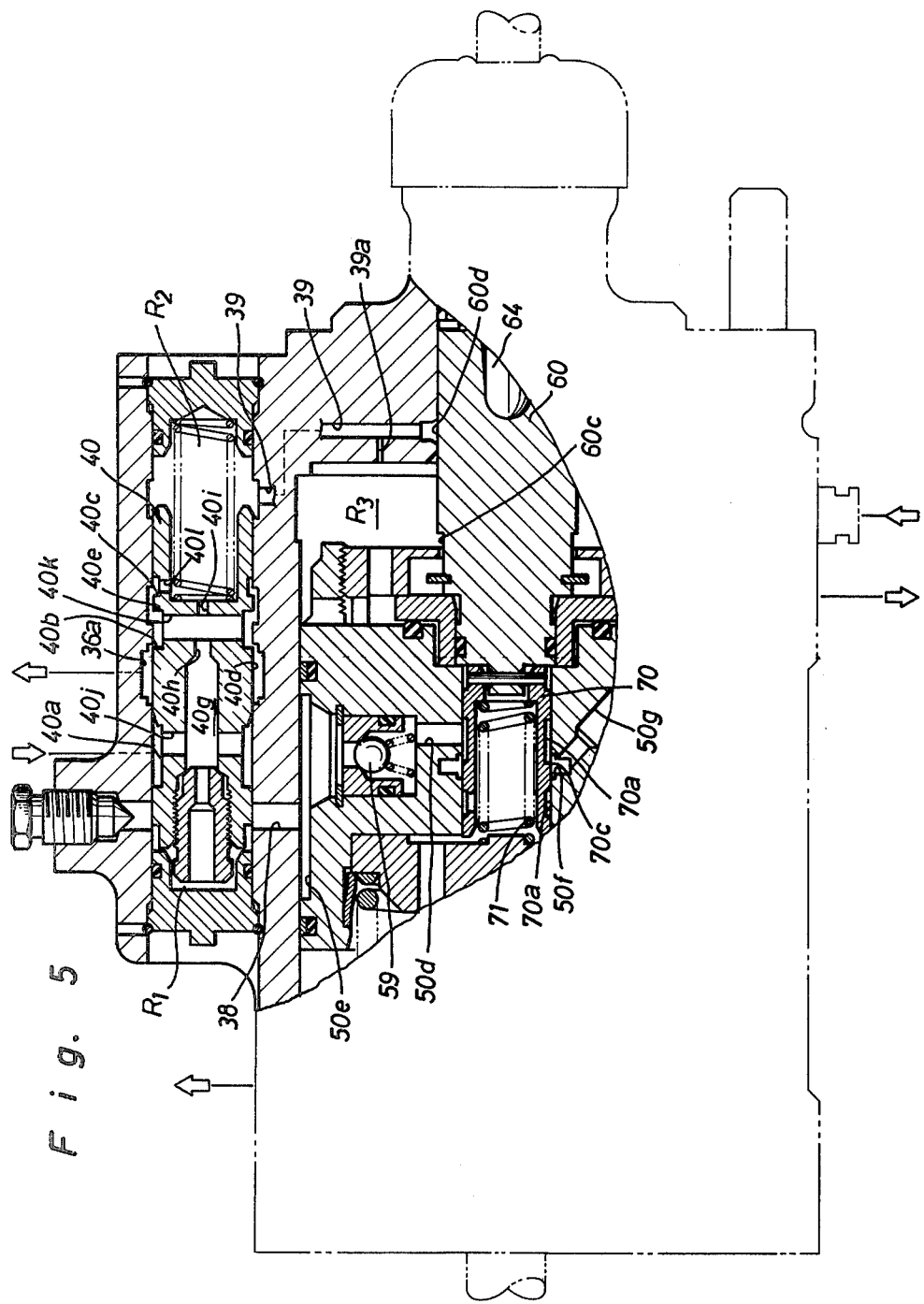

If the brake pedal 63 is further depressed during the operation mentioned above, the pressure in the power chamber $R_3$ is increased up to the maximum value due to pressures applied from the respective pressure chambers $R_1$ and $R_2$. Then, the spool 40 is moved leftward, as shown in FIG. 5, so that the fluid communication between the inlet and outlet ports 31 and 32 is established by way of the groove 40a, the passages 40j, 40g, the orifice 40h, the passage 40k, and the grooves 40b, 36a to ensure the flow of fluid for the power steering device 11. Moreover, when the braking operation is conducted under a condition when steering correction is made, the above-mentioned operation of the brake booster 20 is conducted under a condition that the pressure in the first chamber $R_1$ increases by a predetermined high value.

Upon such an undesired condition that no pressure is supplied to the first chamber $R_1$ due to a trouble of the fluid pump 10, the emergent pump 18 is driven in response to closure of the switch 18a to supply pressurized fluid into the power chamber $R_3$ through the sub-port 35 and the check valve 35a.

Figure 6:
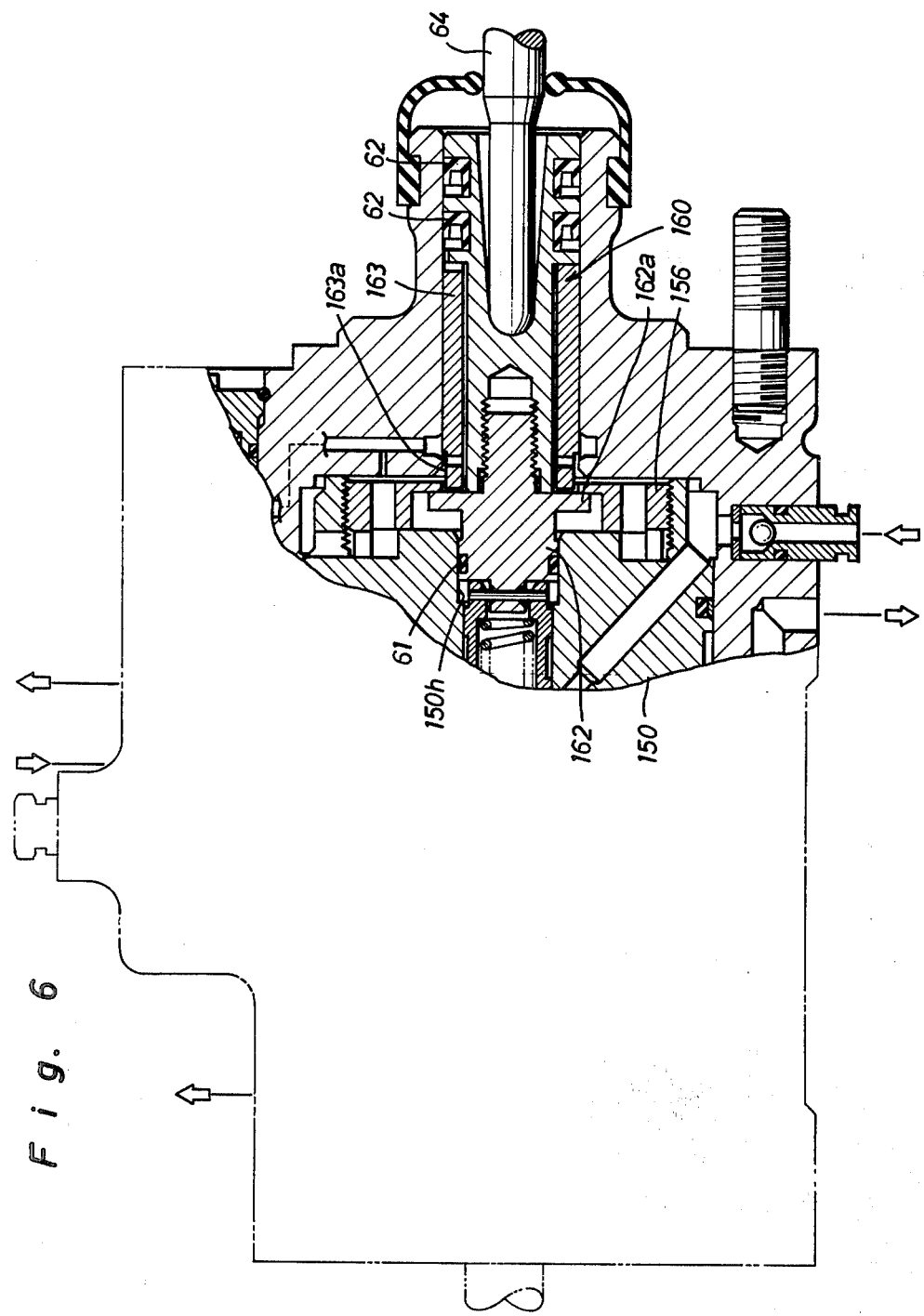
FIG. 6 is a partially broken view showing a modification of the brake booster.

FIG. 6 illustrates a modification of the present invention, wherein a control piston assembly 160 includes a large diameter piston 161, a small diameter piston 162, and a sleeve member 163. The piston 161 is slidably disposed within the small diameter portion of the stepped bore 37 through the annular seal cups 62 and is engaged with the push rod 64. The piston 162 is threaded into the left end of the piston 161 and slidably disposed within a stepped bore 150h of a power piston 150 through an annular seal member 61. The piston 162 is also connected to the tubular spool 70 and has an annular flange 162a engageable with a lock nut 156 threaded into the power piston 150. The sleeve member 163 is slidably engaged with the inner wall of the stepped bore 37 and is provided at its left end with an annular recess 163a to permit the flow of fluid from the passage 39 to the power chamber $R_3$. The sleeve member 163 is also engaged at both ends thereof with the piston 161 and the annular flange 162a of the piston 162. In this modification, the annular recess 163a may correspond with the annular recess 60c of the control piston 60 shown in FIGS. 2 to 5. All other construction is substantially the same as those of the above-mentioned embodiment.

In FIG. 7, there is illustrated another modification of the present invention, in which the orifice 39a of the previous embodiments is replaced with an annular passage 261 between the inner wall of the stepped bore 37 and the outer periphery of a control piston 260. In this modification, the control piston 260 is slidably disposed at its left end within the stepped bore 150h of the power piston 150 and is provided with an annular recess 260c to permit the flow of fluid from the passage 39 to the power chamber $R_3$. All other construction is substantially the same as those of the embodiment shown in FIGS. 2 to 5.

FIG. 8 illustrates a still further modification of the present invention, in which a control piston assembly 360 includes a large diameter piston 361, a small diameter piston 362, a sleeve member 363 and a spiral leaf spring 364. The large diameter piston 361 is slidably disposed within the small diameter portion of the stepped bore 37 through the annular seal cups 62 and is provided thereon with an annular recess 361a to permit the flow of fluid from the passage 39 to the power chamber $R_3$. The small diameter piston 362 is threaded into the left end of the piston 161 and connected at its left end with the tubular spool 70 by the pin 65. The sleeve member 363 is slidably coupled over the piston 362 through an annular seal member 365 and is guided by the inner wall of the stepped bore 150h through an annular seal member 366. Thus, the sleeve member 363 is biased rightward by the spiral spring 364 to maintain engagement with the left end of the large diameter piston 361.

Having now fully set forth both structure and operation of preferred embodiments of the concept underlying the present invention, various other embodiment as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In combination with a hydraulic brake booster for a vehicle having a brake activating means, a master cylinder for supplying pressure to the wheel cylinders of the vehicle, and a hydraulic circuit for circulating pressurized fluid from a fluid pressure source to a reservoir by way of a hydraulic power control device, the brake booster comprising:

a housing for interposition within said hydraulic circuit between said pressure source and said power control device, said housing being provided therein with a stepped cylindrical bore and thereon with an inlet port, an outlet port and a drain port respectively in communication with said pressure source, said power control device and said reservoir;

a power piston reciprocable within a large diameter portion of said stepped cylindrical bore for forming at one side thereof a power chamber and at the other side thereof a drain chamber in communication with said drain port, said power piston being operatively connectable at one end thereof with said master cylinder and being provided therein with an axial bore opening toward said power chamber and said drain chamber;

a control piston reciprocable within a small diameter portion of said stepped cylindrical bore and said axial bore of said power piston to control interconnection between said power chamber and said drain chamber, said control piston being operatively connectable to said brake activating means;

a first passage means for connecting said inlet port to said power chamber through said axial bore of said power piston;

a control means disposed within said axial bore of said power piston for selectively closing and opening the interconnection between said power chamber and said drain chamber in response to movement of said control piston;

a second passage means for connecting said inlet port with said power chamber independently of said first passage means;

a first flow regulating means disposed within said second passage means for controlling the flow of fluid supplied from said inlet port to said power chamber in response to movement of said control piston;

a second flow regulating means disposed within said second passage means between said inlet port and said first flow regulating means for controlling the flow of fluid from said inlet port to said outlet port and the flow of fluid from said inlet port to said power chamber through said first flow regulating means, wherein said first flow regulating means comprises an annular recess provided on the outer periphery of said control piston located within the small diameter portion of said stepped cylindrical bore for permitting the flow of fluid supplied from said inlet port to said power chamber through said second flow regulating means when said control piston is in its original position and blocking the flow of fluid supplied from said inlet port to said power chamber through said second flow regulating means when said control piston is moved toward said drain chamber from the original position; and flow restriction means disposed within said second passage means for throttling the flow of fluid supplied from said inlet port to said power chamber through said second flow regulating means in response to movement of said control piston toward said drain chamber.

2. The brake booster as claimed in claim 1, wherein said flow restriction means comprises an orifice arranged in parallel with said annular recess.

3. The brake booster as claimed in claim 1, said annular recess serving to maintain the flow of fluid supplied from said inlet port to said power chamber through said second flow regulating means during movement of said control piston toward said drain chamber, and said flow restriction means further comprising an annular passage formed around said control piston within the small diameter portion of said stepped bore and being in series with said annular recess for throttling the flow of fluid supplied from said inlet port to said chamber through said second flow regulating means in response to movement of said control piston toward said drain chamber.

* * * * *